United States Patent
Feng et al.

(10) Patent No.: US 8,565,433 B2
(45) Date of Patent: Oct. 22, 2013

(54) METHOD AND SYSTEM FOR MANAGING AIR INTERFACE KEY

(75) Inventors: Chengyan Feng, Guangdong Province (CN); Lu Gan, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,904

(22) PCT Filed: Dec. 14, 2010

(86) PCT No.: PCT/CN2010/079781
§ 371 (c)(1),
(2), (4) Date: Nov. 3, 2011

(87) PCT Pub. No.: WO2011/072599
PCT Pub. Date: Jun. 23, 2011

(65) Prior Publication Data
US 2012/0328103 A1 Dec. 27, 2012

(30) Foreign Application Priority Data
Dec. 18, 2009 (CN) .......................... 2009 1 0261635

(51) Int. Cl.
*H04K 1/00* (2006.01)
(52) U.S. Cl.
USPC ............ 380/270; 455/436; 455/433; 455/435
(58) Field of Classification Search
None
See application file for complete search history.

(56) References Cited

U.S. PATENT DOCUMENTS

| 2005/0111666 A1* | 5/2005 | Blom et al. ................... 380/277 |
| 2010/0220862 A1* | 9/2010 | Geary et al. ................... 380/272 |

FOREIGN PATENT DOCUMENTS

| CN | 101399767 A | 4/2009 |
| CN | 101742498 A | 6/2010 |
| EP | 2187561 A1 * | 5/2010 |

OTHER PUBLICATIONS

ETSI TS 133 401 va.1.1 (Jan. 2009) Digital cellular telecommunications systemDigital cellular telecommunications system (Phase 2+); Universal Mobile Telecommunications System (UMTS); 3GPP System Architecture Evolution (SAE); Security architecture (3GPP TS 33.401 version 8.1.1 Release 8).*
3GPP ETSI_TS_133_102_Version_3.10.0 dated Dec. 31, 2001.
3GPP ETSI_TS_133_401_V8.1 dated Jan. 31, 2009.
International Search Report for PCT/CN2010/079781 dated Mar. 4, 2011.

\* cited by examiner

*Primary Examiner* — Andrew L Nalven
*Assistant Examiner* — Mohammed Waliullah
(74) *Attorney, Agent, or Firm* — Ling Wu; Stephen Yang; Ling and Yang Intellectual Property (57) ABSTRACT

A method and system for managing an air interface key are provided in the present invention, which relate to the communication field; the method including: a serving GPRS Support Node+ (SGSN+) or a Mobile Switching Centre/Visitor Location Register+ (MSC/VLR+) transmits a key distributing message to a Radio Network Controller+ (RNC+), wherein the message carries at least one of an intermediate key $K_{ASME U}$, a ciphering key $CK_U$ or an integrity key $IK_U$.

18 Claims, 3 Drawing Sheets

METHOD AND SYSTEM FOR MANAGING AIR INTERFACE KEY

TECHNICAL FIELD

The present invention relates to the communication field, and particularly relates to a method and system for managing air interface key.

BACKGROUND OF THE RELATED ART

HSPA+, the future evolution way of HSDPA (High Speed Downlink Packet Access) and HSUPA (High Speed Downlink Packet Access), has been finished with technologies of OFDM (Orthogonal Frequency Division Multiplexing) and MIMO (Multiple-Input Multiple-Output) in 3GPP (3rd Generation Partnership Project) Release 7. HSPA+ is the enhanced technology of 3GPP HSPA (including HSPDA and HSUPA), and provides low complexity, low cost smooth evolution way from HSPA to LTE (Long Time Evolution) for HSPA operator.

Figure 1:
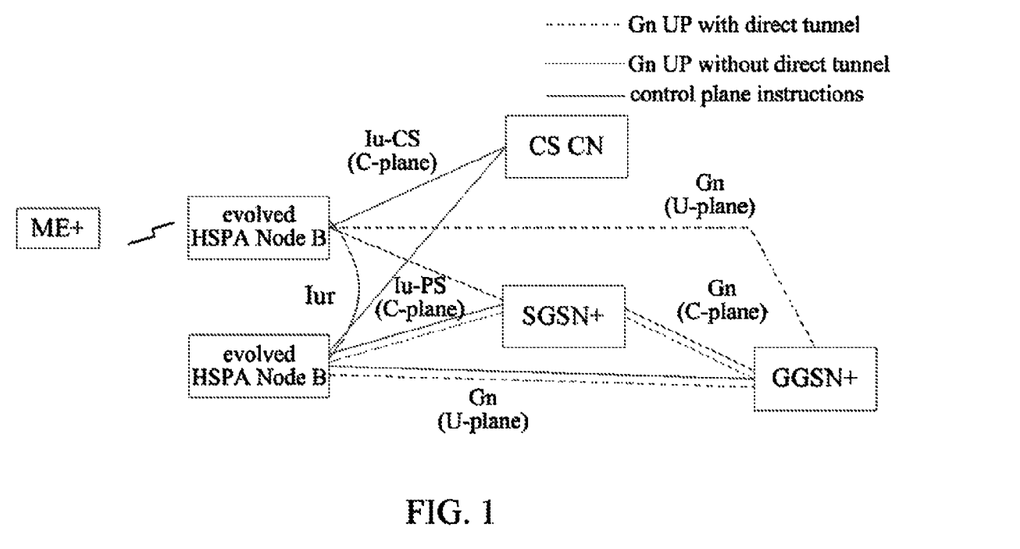
FIG. 1 is representative architecture diagram of radio access network using HSPA+ technique in prior art.

HSPA+ promotes peak data velocity and spectra efficiency by taking the technologies of high order modulation (downlink 64 QAM, uplink 16 QAM), MIMO as well as combination of high order modulation and MIMO and so on. On the other hand, for better supporting packet service, HSPA+ has also taken a series of other enhancement technologies to realize the target such as increasing user capacity, reducing time delay, reducing power consumption of terminal, better supporting VoIP (Voice Over IP) as well as improving multicast/broadcast capability and so on. Compared to HSPA, HSPA+ transfers the function of RNC (Radio Network Controller) to Node B to form completely flat radio access network architecture in system architecture, as shown in FIG. 1. Now the Node B integrating RNC function completely is referred to evolved HSPA Node B, or Node B+ for short. SGSN+ is an SGSN (Serving GPRS Support Node) which is updated and able to support HSPA+ function. UE+ is user terminal equipment which is able to support HSPA+ function. Evolved HSPA+ could use 3GPP Rel-5 and later air interface version, without any modification for air interface HSPA business. After taking the scheme, each Node B+ becomes a node equivalent to RNC with Iu-PS interface being able to connect PS CN directly, and Iu-PS user plane ends at SGSN, while if the network supports direct tunnel function, Iu-PS user plane may also end at GGSN (Gateway GPRS Support Node). Communication between evolved HSPA Nodes B is performed via Iur interface. A Node B+ has the ability of independent networking, and supports complete mobility functions, including a handover between systems and within systems.

Figure 2:
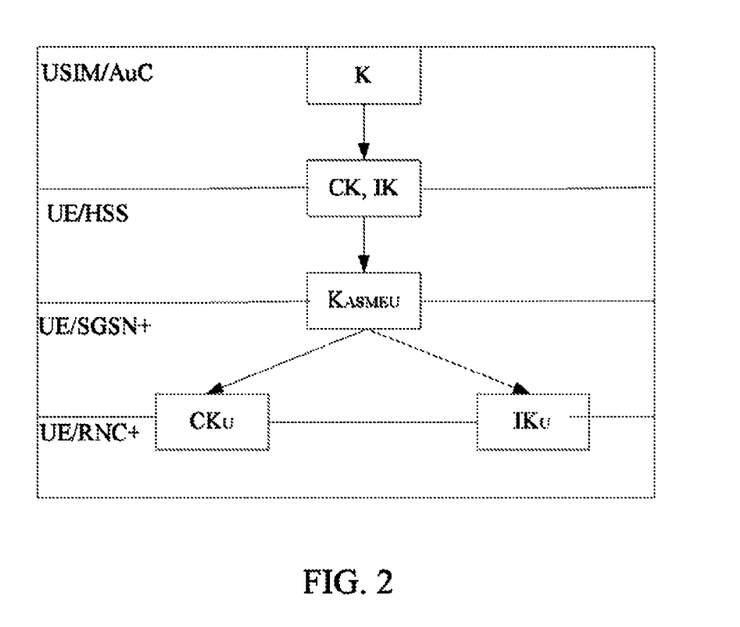
FIG. 2 is representative hierarchy diagram of HSPA+ security key in prior art.

As the user plane data could reach GGSN without through RNC after flattening, this means the encryption and integrity protection function of the user plane must transfer forward to Node B+. Current HSPA+ security key hierarchy provided by Ericsson is shown in FIG. 2. Therein, definitions of K, CK (Ciphering Key) and IK (Integrity Key) fully accord with those in UMTS (Universal Mobile Telecommunications System). That is to say, K is root key stored in AuC (Authentication Center) and USIM (UNIVERSAL SUBSCRIBER IDENTITY MODULE), while CK and IK are the ciphering key and the integrity key computed from K when user equipment and HSS (Home Subscriber Server) perform AKA (Authentication and Key Agreement). In UMTS, RNC uses CK and IK to perform ciphering and integrity protection for data. As RNC function is completely transferred to Node B+ in HSPA+ architecture, both ciphering and decryption are needed to perform at Node B+. But Node B+ is in unsafe condition and security is not very good. Therefore, HSPA+ brings in a key hierarchy similar to EUTRAN (Evolved Universal Terrestrial Radio Access Network), i.e. UTRAN key hierarchy. In UTRAN key hierarchy, an intermediate key $K_{ASMEU}$ is newly brought by HSPA+, deducted by CK and IK. Further, $K_{ASMEU}$ generates $CK_U$ and $IK_U$, therein the $CK_U$ is used for ciphering user plane data and control plane instructions, the $IK_U$ is used for integrity protection for control plane instructions.

However, in current 3GPP standard, there is no generation and distribution method for $K_{ASMEU}$, $CK_U$ and $IK_U$ in the related art.

SUMMARY OF THE INVENTION

In HSPA+ architecture, Node B+ is regarded as a combination of Node B and RNC, which are one physical entity but still two different logical entities. Therefore, Node B+ function network element performing HSPA+ key hierarchy in the invention may be also equivalent to RNC upgraded in UMTS, that may being referred to as RNC+.

The method and system for managing an air interface key provided by the invention realize generation and distributing of the air interface key.

For achieving above mentioned invention target, the invention provides following technical schemes:

a method for managing an air interface key, comprising:

SGSN+ or MSC/VLR+ transmitting a first key distribution message to RNC+, carrying an intermediate key $K_{ASMEU}$ or carrying at least one of the Ciphering Key $CK_U$ and the Integrity Key $IK_U$.

What is carried in the first key distribution message may be $K_{ASMEU}$, and the method may also comprise:

the RNC+ deducting the ciphering key $CK_U$ and/or the integrity key $IK_U$ from the intermediate key $K_{ASMEU}$.

What is carried in the first key distribution message may be the ciphering key $CK_U$ and/or the integrity key $IK_U$, and the method may also comprise: the SGSN+ or MSC/VLR+ deducting the $CK_U$ and/or the $IK_U$ from the intermediate key $K_{ASMEU}$.

Before the step of transmitting the first key distribution message, the method may also comprise: the SGSN+ or MSC/VLR+ deducting the intermediate key $K_{ASMEU}$ from the CK, which is the legacy ciphering key, and the IK, which is the legacy integrity key.

The method may also comprise: the RNC+ transmitting a second key distribution message to UE+.

The method may also comprise:

after a successful authentication for the second key distribution message by the UE+, transmitting a first key distribution response message to the RNC+;

after having received the first key distribution response message and taking a successful authentication or decryption and authentication, the RNC+ transmitting a second key distribution response message to the SGSN+ or MSC/VLR+.

The SGSN+ or MSC/VLR+ may transmit the first key distribution message when anyone of the following conditions is satisfied:

the SGSN+ or MSC/VLR+ completing successfully one AKA;

updating at least one of the CK, the IK and the $K_{ASMEU}$;

the SGSN+ or MSC/VLR+ modifying a ciphering algorithm and/or an integrity algorithm.

The first key distribution message may also carry anyone of following parameters or any combination thereof: user equipment security capability, key set identifier, ciphering algorithm and/or integrity algorithm chosen;

and the second key distribution message may carry anyone of following parameters or any combination thereof: user equipment security capability, key set identifier, ciphering algorithm and/or integrity algorithm chosen;

and each one of the first key distribution response message and the second key distribution response message may carry the ciphering algorithm and/or integrity algorithm chosen.

Each one of the first key distribution message and the second key distribution message may comprise: security mode command message, attach accept message, initial context setup message, RRC reconfiguration message, or location update confirmation message;

and each one of the first key distribution response message and the second key distribution response message may comprise: security mode complete message, attachment complete message, RRC reconfiguration complete message, or TMSI distribution complete message.

Generation parameters of the $K_{ASMEU}$ may comprise IK, CK and one or more of following parameters:

random number NONCE, service network identification (SN ID), sequence number (SQN), anonymity key (AK), authentication management field (AMF), user identity identifier comprising IMSI, IMEI and TMSI, encryption algorithm ID (enc-int-ID), integrity algorithm ID (int-alg-ID), as well as network reentry counter value (COUNTER).

Generation parameters of the $CK_U$ and/or $IK_U$ may comprise $K_{ASMEU}$ and one or more of following parameters:

random number NONCE, service network identification (SN ID), sequence number (SQN), anonymity key (AK), authentication management field (AMF), user identity identifier comprising IMSI, IMEI and TMSI, encryption algorithm ID (enc-int-ID), integrity algorithm ID (int-alg-ID), physical cell identifier (PCI), absolute radio frequency channel number (ARFCN) of downlink or uplink, as well as network reentry counter value (COUNTER).

The method may also comprise:

if the generation parameters of at least one of the $K_{ASMEU}$, the $CK_U$ and the $IK_U$ comprise random number NONCE, and the random number NONCE is generated by the SGSN+ or MSC/VLR+, then the SGSN+ or MSC/VLR+ transmits the random number NONCE to the RNC+, and the RNC+ transmits the random number NONCE to the UE+;

if the generation parameters of the CKU and/or the IKU comprises random number NONCE, and the random number NONCE is generated by the RNC+, then the RNC+ transmits the random number NONCE to the UE+.

The generation parameters of at least one of the $K_{ASMEU}$, the $CK_U$ and/or $IK_U$ may comprise network reentry counter (COUNTER);

the method may also comprise: the UE+ and the SGSN+ or MSC/VLR+ or the RNC+ separately performing conservation management for the COUNTER by the following way:

initializing the COUNTER to be 0 or 1 after one successful AKA process; and/or when the UE+ hands over (comprising serving RNC+ relocating), updates tracking area or quits an idle mode to reenter the network, increasing the network reentry counter by one to trigger at least one of the $K_{ASMEU}$, the $CK_U$ and the $IK_U$ to update.

The invention further provides a system for managing air interface key, comprising SGSN+ or MSC/VLR+, RNC+ and UE+, wherein:

the SGSN+ or MSC/VLR+ is configured to: transmit a first key distribution message to the RNC+, carrying intermediate key $K_{ASMEU}$ or carrying at least one of ciphering key $CK_U$ and integrity key $IK_U$.

The RNC+ may be configured to: deduct the ciphering key $CK_U$ and/or integrity key $IK_U$ from the intermediate key $K_{ASMEU}$ when the intermediate key $K_{ASMEU}$ is carried in the first key distribution message.

The SGSN+ or MSC/VLR+ may be also configured to: deduct the $CK_U$ and/or $IK_U$ from the intermediate key $K_{ASMEU}$ before the $CK_U$ and/or $IK_U$ is carried in the first key distribution message.

The SGSN+ or MSC/VLR+ may be also configured to: deduct the intermediate key $K_{ASMEU}$ according to the legacy ciphering key CK and the legacy integrity key IK before transmitting the first key distribution message.

The RNC+ may be also configured to transmit a second key distribution message to UE+.

The UE+ may be configured to: after receiving the second key distribution message and making a successful authentication, transmit a first key distribution response message to RNC+; RNC+ may be also configured to: after receiving the first key distribution response message and making the successful authentication or decryption and authentication, transmit a second key distribution response message to SGSN+ or MSC/VLR+.

The SGSN+ or MSC/VLR+ may be configured to transmit the first key distribution message when anyone of the following conditions is satisfied:

the SGSN+ or MSC/VLR+ completing successfully one AKA;

updating at least one of the CK, the IK and the $K_{ASMEU}$;

the SGSN+ or MSC/VLR+ modifying a ciphering algorithm and/or an integrity algorithm.

The first key distribution message may further carry anyone of following parameters or any combination thereof: user equipment security capability, key set identifier, ciphering algorithm and/or integrity algorithm chosen;

and the second key distribution message may carry anyone of following parameters or any combination thereof: user equipment security capability, key set identifier, ciphering algorithm and/or integrity algorithm chosen;

and each one of the first key distribution response message and the second key distribution response message may carry ciphering algorithm and/or integrity algorithm chosen.

Each one of the first key distribution message and the second key distribution message may comprise: security mode command message, attach accept message, initial context setup message, RRC reconfiguration message, or location update confirmation message;

and each one of the first key distribution response message and the second key distribution response message may comprise: security mode complete message, attachment complete message, RRC reconfiguration complete message, or TMSI distribution complete message.

The generation parameters of the intermediate key $K_{ASMEU}$ may comprise IK, CK and one or more of following parameters:

random number NONCE, service network identification (SN ID), sequence number (SQN), anonymity key (AK), authentication management field (AMF), user identity identifier comprising IMSI, IMEI and TMSI, encryption algorithm ID (enc-int-ID), integrity algorithm ID (int-alg-ID), as well as network reentry counter value (COUNTER).

The generation parameters of the $CK_U$ and/or $IK_U$ may comprise $K_{ASMEU}$ and one or more of following parameters:

random number NONCE, service network identification (SN ID), sequence number (SQN), anonymity key (AK), authentication management field (AMF), user identity identifier comprising IMSI, IMEI and TMSI, encryption algorithm ID (enc-int-ID), integrity algorithm ID (int-alg-ID), physical cell identifier (PCI), absolute radio frequency channel number (ARFCN) of downlink or uplink, as well as network reentry counter value (COUNTER).

The SGSN+ or MSC/VLR+ may be also configured to: generate random number NONCE and transmit to the RNC+; and the RNC+ may be also configured to: receive random number NONCE and transmit to the UE+, or generate the random number NONCE and transmit to the UE+.

The SGSN+ or MSC/VLR+, RNC+ and UE+ may be also configured to perform conservation management for the network reentry counter value COUNTER by the following way:

initializing the COUNTER to be 0 or 1 after one successful AKA process; and/or when the UE+ hands over (comprising serving RNC+ relocating), updates tracking area or quits an idle mode to reenter the network, increasing the network reentry counter by one to trigger at least one of the $K_{ASMEU}$, the $CK_U$ and the $IK_U$ to update.

In the embodiments of the invention, SGSN+ or MSC/VLR+ generates air interface key and transmits it to the RNC+, or, the SGSN+ or MSC/VLR+ transmits key materials to the RNC+, and then the air interface key is generated by the RNC+, in the present invention, there is provided a generation and distribution flow of the air interface key, accomplishing the generation and distribution of the air interface key.

PREFERRED EMBODIMENTS OF THE PRESENT INVENTION

Technical schemes provided in the embodiments of the invention are further described in the following incorporating with the drawings.

Figure 3:
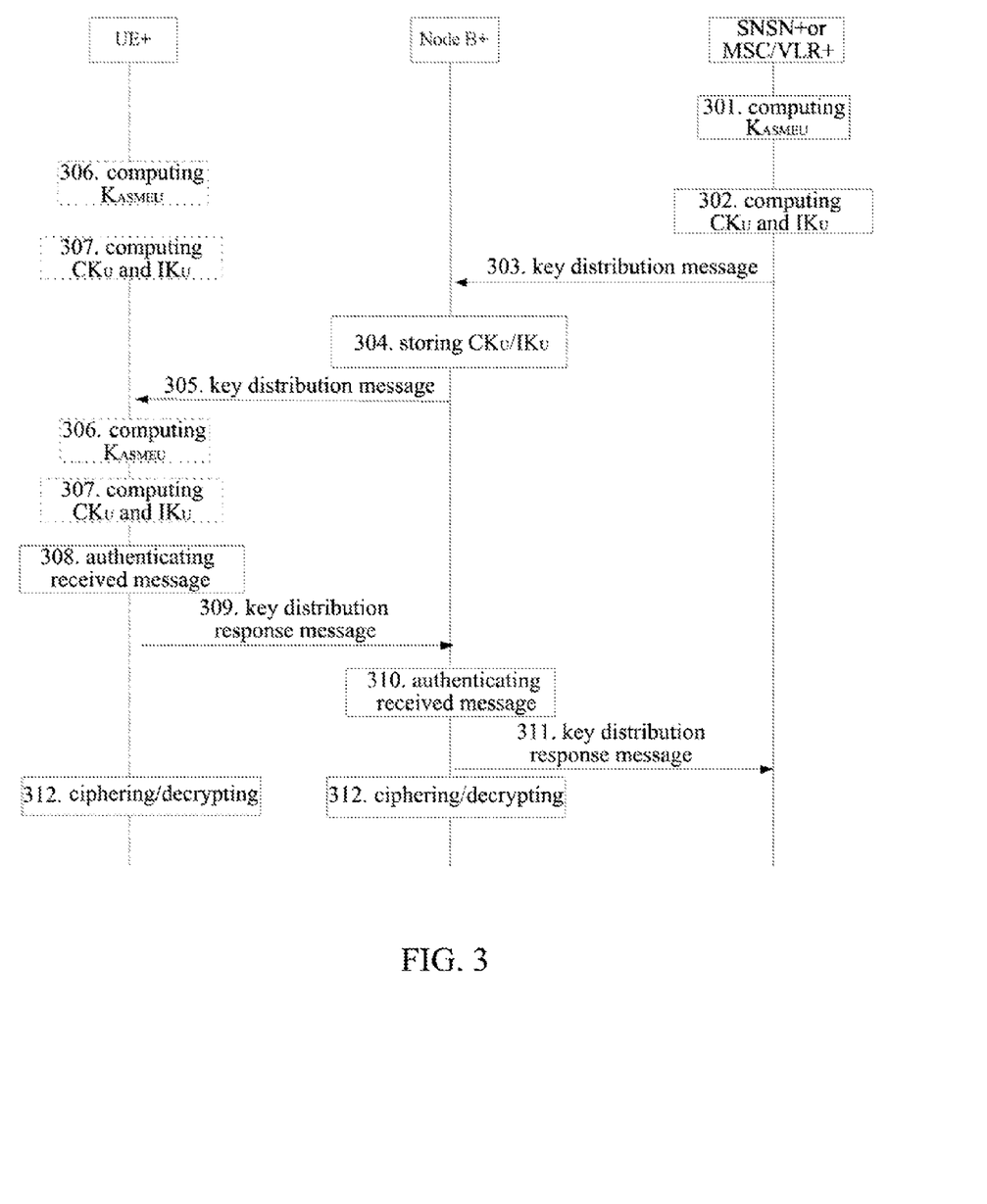
FIG. 3 is a flow chart of the method for the generation and distribution of an air interface in embodiment 1.

The embodiment illustrates an example of the distribution of air interface key by user equipment and base station through security mode command flow, as shown in FIG. 3. The steps are illustrated as follows:

Embodiment 1

The embodiment illustrates an example of distribution of an air interface key by user equipment and base station through key distribution flow, and SGSN+ or MSC/VLR (Mobile Switching CenterNisitor Location Register)+ generates the air interface key and then distribute key to RNC+ in the example, as the detailed process shown in FIG. 3.

Step 301, SGSN+ or MSC/VLR+ computes an intermediate key $K_{ASMEU}$ according to a ciphering key CK and an integrity key IK received from HSS.

Optionally, the step further includes: SGSN+ or MSC/VLR+ deciding allowable ciphering algorithm set and/or integrity algorithm set. Therein the ciphering algorithm and/or integrity algorithm used by SGSN+ or MSC/VLR+ may be a predetermined algorithm, or a re-determined algorithm.

Therein generation parameters of the $K_{ASMEU}$ may also include one or more of the following parameters: random number NONCE generated by SGSN+ or MSC/VLR+, service network identification (SN ID), sequence number (SQN), anonymity key (AK), user identity identifier comprising international mobile subscriber identity (IMSI), international mobile equipment identity (IMEI) and temporary mobile subscriber identity (TMSI), encryption algorithm ID (enc-int-ID), integrity algorithm ID (int-alg-ID), authentication management field (AMF), as well as network reentry counter (COUNTER).

Step 302, SGSN+ or MSC/VLR+ computes the ciphering key $CK_U$ and the integrity key $IK_U$ of HSPA+ according to the intermediate key $K_{ASMEU}$.

Therein the generation parameters of the ciphering key $CK_U$ and the integrity key $IK_U$ may also includes one or more of the following parameters:

random number NONCE generated by SGSN+ or MSC/VLR+, service network identification (SN ID), sequence number (SQN), anonymity key (AK), user identity identifier comprising IMSI, IMEI and TMSI, encryption algorithm ID (enc-int-ID), integrity algorithm ID (int-alg-ID), authentication management field (AMF), physical cell identifier (PCI), absolute radio frequency channel number (ARFCN) of downlink or uplink, as well as network reentry counter (COUNTER).

Step 303, SGSN+ or MSC/VLR+ transmits to RNC+ a key distribution message carrying $CK_U$ and $IK_U$, and also one of the following parameters or any combination thereof: user equipment security capability, key set identifier, ciphering algorithm set and/or integrity algorithm set chosen.

Therein the SGSN+ or MSC/VLR+ transmits the key distribution message when anyone of the following conditions is satisfied, including:

the SGSN+ or MSC/VLR+ completing successfully one AKA;

updating the CK and/or IK and/or $K_{ASMEU}$;

the SGSN+ or MSC/VLR+ modifying the ciphering algorithm and/or the integrity algorithm.

Therein if the generation parameters of the $K_{ASMEU}$ and/or $CK_U$ and/or $IK_U$ include random number NONCE, random number NONCE is included in the key distribution message. The key distribution message may be: security mode command message, or attach accept message, or initial context setup message, or radio resource control (RRC) link reconfiguration message, or location update confirmation message.

Step 304, RNC+ stores $CK_U$ and $IK_U$ after receiving the key distribution message.

Optionally, the step further includes choosing the ciphering algorithm and/or the integrity algorithm from the ciphering algorithm set and/or the integrity algorithm set.

Step 305, RNC+ transmits to the user equipment the key distribution message, carrying message authentication code (MAC) obtained through $IK_U$ computation, and carrying one of the following parameters or any combination thereof: user equipment security capability, key set identifier, ciphering algorithm and/or integrity algorithm chosen.

The key distribution message may be: security mode command message, or attach accept message, or initial context setup message, or RRC reconfiguration message, or location update confirmation message.

Therein if the generation parameters of the $K_{ASMEU}$ and/or $CK_U$ and/or $IK_U$ include random number NONCE, random number NONCE is transmitted to user equipment along with the message.

Step 306, user equipment computes the intermediate key $K_{ASMEU}$ according to the ciphering key CK and the integrity key IK generated in AKA process after receiving the key distribution message.

Optionally, the step further includes: user equipment stores the ciphering algorithm and/or the integrity algorithm.

Therein if the generation parameters of $K_{ASMEU}$ do not include the random number NONCE and/or the network reentry counter COUNTER, the step may occur before receiving the key distribution message.

Step 307, user equipment computes the ciphering key $CK_U$ and the integrity key $IK_U$ according to the intermediate key $K_{ASMEU}$.

Therein if the generation parameters of $CK_U$ and/or $IK_U$ do not include the random number NONCE and/or the network reentry counter COUNTER, the step may occur before receiving the key distribution message.

Step 308, the user equipment authenticates the received key distribution message with $IK_U$.

Step 309, if the authentication of the key distribution message is successful, the user equipment transmits a key distribution response message to RNC+. The message carries message authentication code computed with the $IK_U$, or the message is ciphered with the $CK_U$.

The key distribution response message may be: security mode complete message, or attachment complete message, or RRC reconfiguration complete message, or TMSI distribution complete message.

Step 310, RNC+ authenticates the received key distribution response message with the $IK_U$, or RNC+ firstly decrypt the message with the $CK_U$ and then authenticates the received key distribution response message with the $IK_U$.

Step 311, if authenticating or decrypting successfully, RNC+ transmits the key distribution response message to SGSN+ or MSC/VLR+. Optionally, the key distribution response message carries the parameters: ciphering algorithm and/or integrity algorithm chosen.

The key distribution response message may be: security mode complete message, or attachment complete message, or RRC reconfiguration complete message, or TMSI distribution complete message.

Step 312, the user equipment and RNC+ begin to perform ciphering and decryption operation for user data.

Embodiment 2

Figure 4:
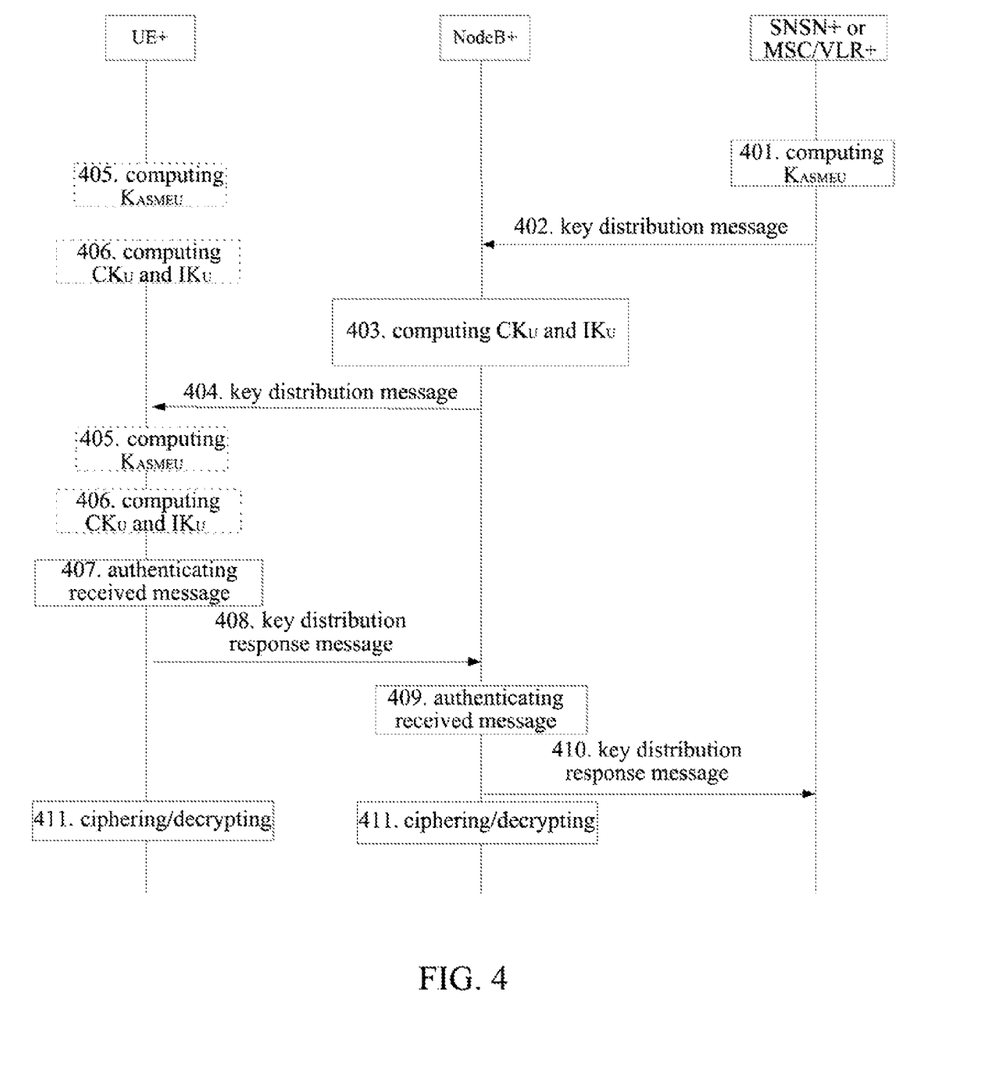
FIG. 4 is a flow chart of the method for the generation and distribution of an air interface in embodiment 2.

The embodiment illustrates another example of the distribution of the air interface key by user equipment and base station through a key distribution flow, as shown in FIG. 4. The distinction between this embodiment and embodiment 1 lies in that the ciphering key $CK_U$ and the integrity key $IK_U$ of HSPA+ are generated at RNC+. At present, SGSN+ or MSC/VLR+ needs to transmit to RNC+ the $K_{ASMEU}$ in key distribution message. If the generation parameters of KASMEU include random number NONCE, the random number NONCE is generated by SGSN+ or MSC/VLR+, and is required to transmit to RNC+ along with the key distribution message. If the generation parameters of $CK_U$ and/or $IK_U$ include random number NONCE, the random number NONCE is generated by RNC+, and is required to transmit to the user equipment along with the key distribution message.

Step 401, SGSN+ or MSC/VLR+ computes $K_{ASMEU}$ according to the ciphering key CK and the integrity key IK received from HSS.

Optionally, the step further includes: SGSN+ or MSC/VLR+ deciding the allowable ciphering algorithm set and/or integrity algorithm set. Therein the ciphering algorithm and/or integrity algorithm used by SGSN+ or MSC/VLR+ may be the predetermined algorithm, or the re-determined algorithm.

Therein the generation parameters of the $K_{ASMEU}$ may also include one or more of the following parameters:

random number NONCE generated by SGSN+ or MSC/VLR+, service network identification (SN ID), sequence number (SQN), anonymity key (AK), user identity identifier comprising IMSI, IMEI and TMSI, encryption algorithm ID (enc-int-ID), integrity algorithm ID (int-alg-ID), authentication management field (AMF), as well as network reentry counter (COUNTER).

Step 402, SGSN+ or MSC/VLR+ transmits the key distribution message to RNC+.

Therein the key distribution message carries $K_{ASMEU}$, and simultaneously carries one of the following parameters or any combination thereof: user equipment security capability, key set identifier, ciphering algorithm set and/or integrity algorithm set chosen.

If the generation parameters of the KASMEU include random number NONCE, and the random number NONCE is generated by SGSN+ or MSC/VLR+, then the random number NONCE is transmitted to RNC+ via the key distribution message.

The key distribution message may be: security mode command message, or attach accept message, or initial context setup message, or RRC reconfiguration message, or location update confirm message.

Step 403, RNC+ computes the ciphering key $CK_U$ and the integrity key $IK_U$ of HSPA+ according to the $K_{ASMEU}$ after receiving the key distribution message.

Optionally, the step further includes: choose the ciphering algorithm and/or the integrity algorithm from the ciphering algorithm set and/or integrity algorithm set.

Step 404, RNC+ transmits to the user equipment the key distribution message, carrying message authentication code (MAC) computed via $IK_U$, and one of the following parameters or any combination thereof: user equipment security capability, key set identifier, ciphering algorithm and/or integrity algorithm chosen.

If the generation parameters of the $K_{ASMEU}$ and/or $CK_U$ and/or $IK_U$ include random number NONCE, the random number NONCE is transmitted to the user equipment along with the message.

The key distribution message may be: security mode command message, or attach accept message, or initial context setup message, or RRC reconfiguration message, or location update confirmation message.

Step 405, the user equipment computes intermediate the key $K_{ASMEU}$ according to the ciphering key CK and integrity key IK generated in AKA process after receiving the key distribution message.

Optionally, the step further includes: the user equipment stores the ciphering algorithm and/or integrity algorithm.

In this step, if the generation parameters of $K_{ASMEU}$ do not include random number NONCE, the step may occur before receiving the key distribution message.

Step 406, the user equipment computes the ciphering key CKu and the integrity key $IK_U$ according to the $K_{ASMEU}$.

In the step, if generation parameters of the CKU and/or IKU do not include random number NONCE, the step may occur before receiving the key distribution message.

Step 407, the user equipment authenticates the received key distribution message with the $IK_U$.

Step 408, if the authentication of the key distribution message is successful, the user equipment transmits a key distribution response message to RNC+. The message carries message authentication code (MAC) computed via the $IK_U$, or the message is ciphered with the $CK_U$.

The key distribution response message may be: security mode complete message, or attachment complete message, or RRC reconfiguration complete message, or TMSI distribution complete message.

Step 409, RNC+ authenticates the received key distribution response message with the $IK_U$, or RNC+ firstly decrypt the message with the $CK_U$ and then authenticates the received key distribution response message with the $IK_U$.

Step 410, if authenticating or decrypting of the key distribution response message is successful, RNC+ transmits a key distribution response message to SGSN+ or MSC/VLR+. Optionally, the message carries parameters: ciphering algorithm and/or integrity algorithm chosen.

The key distribution response message may be: security mode complete message, or attachment complete message, or RRC reconfiguration complete message, or TMSI distribution complete message.

Step 411, the user equipment and RNC+ begin to perform ciphering and decryption operation for user data.

Embodiment 3

This embodiment illustrates an example of computing the $K_{ASMEU}$ via IK and CK. Other than IK and CK, the generation parameters of the $K_{ASMEU}$ include one of the following or any combination thereof: random number NONCE generated by SGSN+ or MSC/VLR+ or RNC+, service network identification (SN ID), sequence number (SQN), anonymity key (AK), authentication management field (AMF), user identity identifier (such as IMSI, IMEI and TMSI), encryption algorithm ID (enc-int-ID), integrity algorithm ID (int-alg-ID), network reentry counter (COUNTER).

$K_{ASMEU}$=F1 (CK, IK, NONCE);
or $K_{ASMEU}$=F1 (CK, IK, SN ID);
or $K_{ASMEU}$=F1 (CK, IK, SN ID, SQN, AK);
or $K_{ASMEU}$=F1 (CK, IK, SN ID, SQN);
or $K_{ASMEU}$=F1 (CK, IK, SN ID, AK);
or $K_{ASMEU}$=F1 (CK, IK, SQN, AK);
or $K_{ASMEU}$=F1 (CK, IK, SQN, AK);
or $K_{ASMEU}$=F1 (CK, IK, COUNTER).

Therein, the generation parameter of $K_{ASMEU}$, COUNTER, is the times to reenter the network, which is separately stored and managed by the user equipment and SGSN+ and/or MSC/VLR+ and/or RNC+, is configured to 0 or 1 initially and increased by 1 when the UE+ hands over (comprising serving RNC+ relocating), updates tracking area or quits an idle mode to reenter the network, thereby to trigger the $K_{ASMEU}$ and/or $CK_U$ and/or $IK_U$ to update. Therein F is any key generation algorithm, such as KDF algorithm defined by 3GPP.

Embodiment 4

The embodiment illustrates an example of computing the $CK_U$ and $IK_U$ via the $K_{ASMEU}$. Besides the $K_{ASMEU}$, the generation parameters of the $CK_U$ and $IK_U$ include one of the following or any combination thereof: random number NONCE generated by SGSN+ or MSC/VLR+ or RNC+, service network identification (SN ID), sequence number (SQN), anonymity key (AK), user identity identifier (such as IMSI, IMEI and TMSI), encryption algorithm ID (enc-int-ID), integrity algorithm ID (int-alg-ID), (Physical cell identification) PCI, ARFCN (Absolute Radio Frequency Channel Number) (downlink or uplink), network reentry counter value (COUNTER).

$CK_U$=F2 ($K_{ASMEU}$, enc-alg-ID), $IK_U$=F2 ($K_{ASMEU}$, int-alg-ID);
or ($CK_U$, $IK_U$)=F2 ($K_{ASMEU}$, NONCE);
or $CK_U$=F2 ($K_{ASMEU}$, NONCE||enc-alg-ID) $IK_U$=F2 ($K_{ASMEU}$, NONCE||int-alg-ID);
or ($CK_U$, $IK_U$)=F2 ($K_{ASMEU}$, PCI||ARFCN)—corresponding to the scene when $CK_U$/$IK_U$ is generated at RNC+;
or ($CK_U$, $IK_U$)=F2 ($K_{ASMEU}$, IMSI||PCI||ARFCN)—corresponding to the scene when $CK_U$/$IK_U$ is generated at RNC+;
or ($CK_U$, $IK_U$)=F2 ($K_{ASMEU}$, COUNTER).

Therein, the generation parameter of $CK_U$ and $IK_U$, COUNTER, is the times to reenter the network, which is separately stored and managed by user equipment and RNC+, is configured to 0 or 1 initially and increased by 1 when the UE+ hands over (comprising serving RNC+ relocating), updates tracking area or quits an idle mode to reenter the network, thereby to trigger the $CK_U$ and/or $IK_U$ to update.

Therein F is any key generation algorithm, such as KDF algorithm defined by 3GPP.

The invention also provides a system for managing an air interface key, comprising SGSN+ or MSC/VLR+, RNC+ and UE+, the SGSN+ or MSC/VLR+ is configured to: transmit to the RNC+ a key distribution message carrying an intermediate key $K_{ASMEU}$ or carrying at least one of ciphering key $CK_U$ and integrity key $IK_U$.

Optionally, the RNC+ is configured to: deduct the ciphering key $CK_U$ and/or the integrity key $IK_U$ according to the intermediate key $K_{ASMEU}$ when the intermediate key $K_{ASMEU}$ is carried in the key distribution message.

Optionally, the ciphering key $CK_U$ and/or integrity key $IK_U$ in the key distribution message is generated according to the intermediate key $K_{ASMEU}$ by the SGSN+ or MSC/VLR+.

Optionally, the intermediate key $K_{ASMEU}$ is deducted according to CK and IK by the SGSN+ or MSC/VLR+.

Optionally, the RNC+ is also configured to transmit the key distribution message to the UE+.

Optionally, after receiving the key distribution message and making successful authentication, the UE+ transmits the key distribution response message to RNC+; and RNC+ transmits a key distribution response message to SGSN+ or MSC/VLR+ after receiving the message and making successful authentication or decryption and authentication.

Optionally, the SGSN+ or MSC/VLR+ manages the air interface when anyone of the following conditions is satisfied:

the SGSN+ or MSC/VLR+ completing successfully one authentication and key agreement (AKA);

updating at least one of ciphering key CK, integrity key IK and intermediate key $K_{ASMEU}$;

the SGSN+ or MSC/VLR+ modifying ciphering algorithm and/or integrity algorithm.

Optionally, the key distribution message transmitted to the RNC+ by the SGSN+ or MSC/VLR+ further carries anyone of following parameters or any combination thereof: user equipment security capability, key set identifier, ciphering algorithm and/or integrity algorithm chosen; and the key distribution message transmitted to UE+ by the RNC+ carries anyone of following parameters or any combination thereof: user equipment security capability, key set identifier, ciphering algorithm and/or integrity algorithm chosen; and key distribution response message carries the following parameters: ciphering algorithm and/or integrity algorithm chosen.

Optionally, the key distribution message is: security mode command message, attach accept message, initial context setup message, RRC reconfiguration message, or location update confirm message;

The key distribution response message is: security mode complete message, attachment complete message, RRC reconfiguration complete message, or TMSI distribution complete message.

Optionally, the generation parameters of the $K_{ASMEU}$ include IK, CK and one or more of following parameters:

random number NONCE, service network identification (SN ID), sequence number (SQN), anonymity key (AK), user identity identifier comprising IMSI, IMEI and TMSI, encryption algorithm ID (enc-int-ID), integrity algorithm ID (int-alg-ID), authentication management field (AMF), as well as network reentry counter value (COUNTER).

Optionally, the generation parameters of the $CK_U$ and/or $IK_U$ includes the $K_{ASMEU}$ and one or more of following parameters:

random number NONCE, service network identification (SN ID), sequence number (SQN), anonymity key (AK), user identity identifier comprising IMSI, IMEI and TMSI, encryption algorithm ID (enc-int-ID), integrity algorithm ID (int-alg-ID), authentication management field (AMF), physical cell identifier (PCD, absolute radio frequency channel number (ARFCN) of downlink or uplink, as well as network reentry counter value (COUNTER).

Optionally, if the generation parameters of at least one of the $K_{ASMEU}$, the $CK_U$ and the $IK_U$ comprise random number NONCE, and the random number NONCE is generated by the SGSN+ or MSC/VLR+, then the SGSN+ or MSC/VLR+ transmits the random number NONCE to the RNC+, and the RNC+ transmits the random number NONCE to the UE+;

if the generation parameters of the $CK_U$ and/or the $IK_U$ comprise random number NONCE, and the random number NONCE is generated by the RNC+, then the RNC+ transmits the random number NONCE to the UE+.

Optionally, if the generation parameters of at least one of the $K_{ASMEU}$, the $CK_U$ and the $IK_U$ comprise network reentry counter (COUNTER), the network reentry counter is stored and managed by user side and network side (SGSN+ or MSC/VLR+ or RNC+) separately in the following way:

initializing the counter to be 0 or 1 after one successful AKA process; and/or when the UE+ hands over (comprising serving RNC+ relocating), updates tracking area or quits an idle mode to reenter the network, increasing the network reentry counter by one to trigger the $K_{ASMEU}$ and/or the $CK_U$ and/or the $IK_U$ to update.

In the technical scheme provided in the invention, RNC+ obtains an air interface key form SGSN+ or MSC/VLR+, or obtains associated information from SGSN+ or MSC/VLR+ and generates the air interface key itself, realizing the generation and distribution of air interface key.

In the technical scheme provided in the invention, SGSN+ or MSC/VLR+ generates air interface key and transmits it to RNC+, or, SGSN+ or MSC/VLR+ transmits key materials to RNC+, and then RNC+ generates an air interface key. The invention provides a generation and distribution flow of an air interface key, realizing the generation and distribution of the air interface key.

A person skilled in the art should understand that part or all of the steps for realizing the above examples may be accomplished by associated hardware instructed by program, which may be stored in a computer readable storage medium, and one of the steps in the examples or combination thereof is included when the program runs.

Further, each function unit in various examples of the invention may be accomplished in the form of hardware or accomplished in the form of software function module. When accomplished in the form of software function module and being sold or used as independent products, the integrated module may be also stored in a computer readable storage medium.

The above mentioned storage medium could be read only memory, disk or optical disc and so on.

The above is only specific examples of the present invention and is not intended to limit the present invention. For a person skilled in the art, it is readily obvious to contemplate modifications or alternatives in the scope of the invention, which shall fall into the protection scope of the present invention. Thereby, the protection scope of the present invention should be based on the protection scope of the claims.

Industrial Applicability

Compared to the related art, in the invention, an air interface key is generated by SGSN+ or MSC/VLR+ and transmitted to RNC+, or key materials are transmitted to RNC+ by SGSN+ or MSC/VLR+ and then the air interface key is generated by RNC+, accomplishing generation and distribution of an air interface key of HSPA+ flat system.

What is claimed is:

1. A method for managing an air interface key in a High Speed Packet Access+ (HSPA+) architecture, comprising:
   a Serving General Packet Radio Service (GPRS) Support Node+ (SGSN+) or Mobile Switching Center/Visitor Location Register+ (MSC/VLR+) generating an intermediate key $K_{ASMEU}$ according to a legacy ciphering key CK and a legacy integrity key IK;
   the SGSN+ or MSC/VLR+ transmitting to a Radio Network Controller+ (RNC+) a first key distribution message carrying the intermediate key $K_{ASMEU}$ or carrying a ciphering key $CK_U$ and/or an integrity key $IK_U$;
   wherein, when the intermediate key $K_{ASMEU}$ is carried in the first key distribution message, the method further comprising: the RNC+ generating the ciphering key $CK_U$ and/or the integrity key $IK_U$ according to the intermediate key $K_{ASMEU}$; when the ciphering key $CK_U$ and/or the integrity key $IK_U$ is carried in the first key distribution message, the method further comprising: the SGSN+ or MSC/VLR+ generating the ciphering key $CK_U$ and/or the integrity key $IK_U$ according to the intermediate key $K_{ASMEU}$ before transmitting the first key distribution message to the RNC+.

2. The method of claim 1, further comprising: the RNC+ transmitting a second key distribution message to a User Equipment+ (UE+).

3. The method of claim 2, further comprising:
   after successfully authenticating the second key distribution message, the UE+ transmitting a first key distribution response message to the RNC+;
   after receiving the first key distribution response message and successfully authenticating or decrypting and authenticating, the RNC+ transmitting a second key distribution response message to the SGSN+ or MSC/VLR+.

4. The method of claim 1, wherein, the SGSN+ or MSC/VLR+ transmits the first key distribution message to the RNC+ when anyone of following conditions is satisfied:
   the SGSN+ or MSC/VLR+ completing successfully one authentication and key agreement (AKA);
   updating at least one of the ciphering key CK, the integrity key IK and the intermediate key $K_{ASMEU}$;
   the SGSN+ or MSC/VLR+ modifying a ciphering algorithm and/or an integrity algorithm.

5. The method of claim 4, wherein,
   each one of the first key distribution message and the second key distribution message comprises: security mode command message, attach accept message, initial context setup message, radio resource control (RRC) link reconfiguration message, or location update confirmation message;

each one of the first key distribution response message and the second key distribution response message comprises: security mode complete message, attachment complete message, RRC reconfiguration complete message, or temporary mobile subscriber identity (TMSI) distribution complete message.

6. The method of claim 5, wherein, generation parameters of the $K_{ASMEU}$ comprise the integrity key IK, the ciphering key CK and one or more of following parameters:

random number NONCE, service network identification, sequence number (SQN), anonymity key (AK), authentication management field (AMF), user identity identifier comprising international mobile subscriber identity (IMSI), international mobile equipment identity (IMEI) and temporary mobile subscriber identity (TMSI), encryption algorithm identifier (enc-int-ID), integrity algorithm identifier (int-alg-ID), as well as network reentry counter value (COUNTER).

7. The method of claim 6, wherein, the generation parameters of the $CK_U$ and/or $IK_U$ comprising the intermediate key $K_{ASMEU}$ and one or more of following parameters:

random number NONCE, service network identification, sequence number (SQN), anonymity key (AK), authentication management field (AMF), user identity identifier comprising IMSI, IMEI and TMSI, encryption algorithm identifier (enc-int-ID), integrity algorithm identifier (int-alg-ID), physical cell identifier (PCI), absolute radio frequency channel number (ARFCN) of downlink or uplink, as well as network reentry counter value (COUNTER).

8. The method of claim 7, further comprising:

if the generation parameters of at least one of the $K_{ASMEU}$, the $CK_U$ and the $IK_U$ comprise random number NONCE, and the random number NONCE is generated by the SGSN+ or MSC/VLR+, then the SGSN+ or MSC/VLR+ transmitting the random number NONCE to the RNC+, the RNC+ transmitting the random number NONCE to the UE+;

if the generation parameters of the $CK_U$ and/or the $IK_U$ comprise random number NONCE, and the random number NONCE is generated by the RNC+, then the RNC+ transmitting the random number NONCE to the UE+.

9. The method of claim 7, wherein, the generation parameters of at least one of the $K_{ASMEU}$, the $CK_U$ and the $IK_U$ comprises network reentry counter value (COUNTER);

the method further comprising: the UE+ and the SGSN+ or MSC/VLR+ or the RNC+ separately performing conservation management for the COUNTER by following ways:

initializing the COUNTER to be 0 or 1 after one successful AKA process; and/or when UE+ hands over, updates tracking area or quits an idle mode to reenter a network, increasing the network reentry counter by one to trigger at least one of the $K_{ASMEU}$, the $CK_U$ and the $IK_U$ to update;

wherein, that the UE+ hands over comprises: serving RNC+ relocating.

10. A system for managing an air interface key in a High Speed Packet Access+ (HSPA+) architecture, comprising a Serving General Packet Radio Service (GPRS) Support Node+ (SGSN+) or Mobile Switching Center/Visitor Location Register+ (MSC/VLR+), a Radio Network Controller+ (RNC+) and a User Equipment+ (UE+), wherein, the SGSN+ or MSC/VLR+ is configured to generate an intermediate key $K_{ASMEU}$ according to a legacy ciphering key CK and a legacy integrity key IK, and transmit to the RNC+ a first key distribution message carrying the intermediate key $K_{ASMEU}$ or carrying a ciphering key $CK_U$ and/or an integrity key $IK_U$;

the RNC+ is configured to generate the ciphering key $CK_U$ and/or the integrity key $IK_U$ according to the intermediate key $K_{ASMEU}$ when the intermediate key $K_{ASMEU}$ is carried in the first key distribution message;

the SGSN+ or MSC/VLR+ is also configured to generate the $CK_U$ and/or the $IK_U$ according to the intermediate key $K_{ASMEU}$ before transmitting the first key distribution message to the RNC+ when the ciphering key $CK_U$ and/or the integrity key $IK_U$ is carried in the first key distribution message.

11. The system of claim 10, wherein, the RNC+ is also configured to: transmit a second key distribution message to the UE+.

12. The system of claim 11, wherein, the UE+ is configured to: transmit a first key distribution response message to RNC+ after receiving the second key distribution message and authenticating successfully;

the RNC+ is also configured to: transmit a second key distribution response message to SGSN+ or MSC/VLR+ after receiving the first key distribution response message and successfully authenticating or decrypting and authenticating.

13. The system of claim 10, wherein, the SGSN+ or MSC/VLR+ is configured to transmit the first key distribution message when anyone of following conditions is satisfied:

the SGSN+ or MSC/VLR+ completing successfully one authentication and key agreement (AKA);

updating at least one of the CK, the IK and the $K_{ASMEU}$;

the SGSN+ or MSC/VLR+ modifying a ciphering algorithm and/or an integrity algorithm.

14. The system of claim 13, wherein, each one of the first key distribution message and the second key distribution message comprises: security mode command message, attach accept message, initial context setup message, RRC reconfiguration message, or location update confirmation message;

each one of the first key distribution response message and the second key distribution response message comprises: security mode complete message, attachment complete message, RRC reconfiguration complete message, or temporary mobile subscriber identity (TMSI) distribution complete message.

15. The system of claim 14, wherein, generation parameters of the $K_{ASMEU}$ comprises the integrity key IK, the ciphering key CK and one or more of following parameters:

random number NONCE, service network identification (SN ID), sequence number (SQN), Anonymity Key (AK), Authentication Management Field (AMF), user identity identifier comprising international mobile subscriber identity (IMSI), international mobile equipment identity (IMEI) and temporary mobile subscriber identity (TMSI), encryption algorithm identifier (enc-int-ID), integrity algorithm identifier (int-alg-ID), as well as network reentry counter value (COUNTER).

16. The system of claim 15, wherein, the generation parameters of the CKu and/or IKu comprise the intermediate key KASMEU and one or more of following parameters:

random number NONCE, service network identification (SN ID), sequence number (SQN), anonymity key (AK), authentication management field (AMF), user identity identifier comprising IMSI, IMEI and TMSI, encryption algorithm identifier (enc-int-ID), integrity algorithm identifier (int-alg-ID), physical cell identifier (PCI), absolute radio frequency channel number (ARFCN) of downlink or uplink, as well as network reentry counter value (COUNTER).

17. The system of claim 16, wherein,
the SGSN+ or MSC/VLR+ is also configured to: generate random number NONCE and transmit the random number NONCE to the RNC+;
the RNC+ is also configured to: receive and transmit the random number NONCE to the UE+, or generate and transmit the random number NONCE to the UE+.

18. The system of claim 16, wherein,
the SGSN+ or MSC/VLR+, the RNC+ and the UE+ is also configured to perform conservation management for the network reentry counter value (COUNTER) by following ways:
initializing the COUNTER to be 0 or 1 after one successful AKA process; and/or
when the UE+ hands over, updates tracking area or quits an idle mode to reentry a network, increasing the network reentry counter by one to trigger at least one of the $K_{ASMEU}$, the $CK_U$ and the $IK_U$ to update;
wherein, that the UE+ hands over comprises: serving RNC+ relocating.

* * * * *